United States Patent
Walley et al.

(10) Patent No.: US 6,862,313 B2
(45) Date of Patent: Mar. 1, 2005

(54) DIRECT CONVERSION SPREAD SPECTRUM TIME DIVISION DUPLEX RADIO

(75) Inventors: John S. Walley, Lake Forest, CA (US); D. Vincent Laub, Irvine, CA (US); Norman J. Beamish, Costa Mesa, CA (US)

(73) Assignee: Skyworks Solutions Inc., Irvine, CA (US)

( * ) Notice: Subject to any disclaimer, the term of this patent is extended or adjusted under 35 U.S.C. 154(b) by 499 days.

(21) Appl. No.: 10/127,061

(22) Filed: Apr. 18, 2002

(65) Prior Publication Data

US 2003/0012260 A1 Jan. 16, 2003

Related U.S. Application Data

(63) Continuation of application No. 09/107,733, filed on Jun. 30, 1998, now Pat. No. 6,411,646.

(51) Int. Cl.[7] .......................... H04B 15/00; H04K 1/00; H04L 27/30
(52) U.S. Cl. ....................... 375/141; 375/146; 375/147; 375/303; 375/334; 375/272
(58) Field of Search ................................. 375/140–143, 375/146, 147, 150, 152, 341, 340, 272, 303, 334; 332/100, 128, 112, 119, 127

(56) References Cited

U.S. PATENT DOCUMENTS

| | | | |
|---|---|---|---|
| 4,471,328 A | | 9/1984 | Chapman |
| 4,489,413 A | * | 12/1984 | Richmond et al. .......... 370/278 |
| 4,972,430 A | | 11/1990 | Cantwell |
| 5,027,087 A | | 6/1991 | Rottinghaus |
| 5,088,111 A | * | 2/1992 | McNamara et al. ........ 375/290 |
| 5,142,550 A | | 8/1992 | Tymes |
| 5,280,498 A | * | 1/1994 | Tymes et al. ................ 370/328 |
| 5,479,441 A | * | 12/1995 | Tymes et al. ................ 375/130 |
| 5,581,599 A | * | 12/1996 | Tsuji et al. .................. 455/415 |
| 5,648,985 A | * | 7/1997 | Bjerede et al. ............. 375/219 |
| 5,767,791 A | * | 6/1998 | Stoop et al. ........... 340/870.11 |
| 5,802,463 A | * | 9/1998 | Zuckerman ................. 455/208 |
| 6,223,053 B1 | | 4/2001 | Friedmann et al. |
| 6,278,864 B1 | * | 8/2001 | Cummins et al. ............. 455/73 |
| 6,633,550 B1 | * | 10/2003 | Gardenfors et al. ........ 370/280 |

FOREIGN PATENT DOCUMENTS

WO    WO 96/32784    10/1996

OTHER PUBLICATIONS

John Proakis, "Digital Communications", Copyright 1995, 1989, 1983 by McGraw–Hill, Inc., pp. 806–808.

* cited by examiner

Primary Examiner—Phuong Phu
(74) Attorney, Agent, or Firm—Knobbe Martens Olson & Bear LLP

(57) ABSTRACT

A wireless transceiver comprises a digital to analog converter having an input for receiving a digital representation of a direct sequence spread spectrum signal and having an analog output. A filter has an input coupled to the analog output of the digital to analog converter. An adder has a first input coupled to the filtered output and a second input coupled to a loop control voltage generated by a phase lock loop. A VCO integrated into the phase lock loop has a control input coupled to the summed output. An RF output of the VCO produces a continuous phase frequency shift keyed spread spectrum signal in response to the digital representation of the direct sequence spread spectrums signal. A receiver converts received RF signal to baseband in-phase and quadrature that are in turn converted to digitized signals. A demodulator produces chip data that is despread using a matched filter.

26 Claims, 3 Drawing Sheets

PHASE DIFFERENCE = $2\cos^{-1}m$

DIRECT CONVERSION SPREAD SPECTRUM TIME DIVISION DUPLEX RADIO

RELATED APPLICATIONS

This application is a continuation of, and claims the benefit of, U.S. application Ser. No. 09/107,733, filed Jun. 30, 1998 now U.S. Pat. No. 6,411,646, the entire subject matter of which is hereby incorporated herein by reference.

BACKGROUND OF THE INVENTION

1. Field of the Invention

The invention relates generally to communications. More specifically, the invention relates to wireless telecommunications.

2. Description of the Related Art

The cordless telephone has become a popular consumer good. The cordless telephone allows a user to untether himself from a wired connection to his local telephone line. Typically, a cordless telephone is comprised of two units: a base unit and a handset. The base unit connects to the public switched telephone network typically using a standard RJ-11 connector. The base unit provides a wireless connection to a handset. The handset is capable of receiving and transmitting signals over a wireless link to the base unit. The use of the wireless link allows the handset to communicate with the base unit.

The consumer cordless telephone market is a competitive market. Cordless telephone products on the market compete with one another based on audio quality, reliability over various operating conditions, privacy, battery life, the physical range over which the device operates, and cost. In order to achieve favorable measures of these characteristics, the wireless interface which connects the handset to the base unit must operate efficiently.

One efficient way which cordless telephones operate is called time division duplex (TDD). In time division duplex, the base unit and the handset alternately transmit such that the units do not transmit at the same time. In a time division duplex system, the same frequency band can be used for both transmission and reception. By using time division duplex, the transmit and receive circuitry within each unit can share common components. In addition, each unit requires less internal isolation between the transmit and receive circuitry. For these reasons, a cordless telephone which operates using time division duplex can be cheaper, more reliable and yet produce higher quality audio signals than a full duplex unit. Even though the wireless link operates using time division duplex, audio compression techniques are used to provide concurrent bi-directional audio communication to the user. Therefore, even though the wireless link signals are time division duplex, the end user perceives simultaneous bidirectional audio communication.

Another technique used in cordless telephones is direct sequence spread spectrum (DSSS). Spread spectrum signals used for the transmission of digital information are distinguished by the characteristic that their bandwidth is much greater than their information rate in bits per second. The large redundancy introduced by spread spectrum operation can be used to overcome severe levels of interference. In addition, spread spectrum can be used to introduce pseudo-randomness into the signal. Transmission signals spread with a pseudo-random code appear to be random noise and are difficult to demodulate by receivers other than the intended receiver. In this way, a system which uses direct sequence spread spectrum is less vulnerable to accidental or deliberate reception by a third party. In this way, direct sequence spread spectrum, in conjunction with a scrambling scheme, provides a significant element of privacy in the communications channel.

In a direct sequence spread spectrum system, data bits are modulated with a spreading sequence before transmission. Each bit of information is modulated with a series of chips from the spreading sequence. The ratio of the number of chips per bit defines the coding gain. A greater number of chips per bit creates a greater immunity to noise and other interference. For example, in one common cordless telephone spreading technique, each information bit is modulated with a 12 bit spreading code. Because a cordless telephone using direct sequence spread spectrum has some immunity to noise and other interference, the cordless telephone handset may transmit a very low output power. By decreasing the transmit power, the battery life of the handset is increased.

In a typical embodiment, the spreading code contains an even number of one's and zero's. In this way, the energy of the spread spectrum signal is minimized at and close to 0 Hz. For this reason, a baseband spread signal may be subjected to highpass or bandpass filtering with little effect on the information content. In a system in which each information bit is modulated with a 12 bit spreading code, a preferred spreading code can be chosen by examination of the spectral content of each possible 12 bit sequence which is comprised of six 0's and six 1's.

Prior to application of the spreading code to the information bit stream, the information bits may undergo a series of digital operations which further increase the performance of the system. For example, the information bits may undergo differential encoding in order to be more intolerant to an incorrect phase lock in the receiving unit phase locked loop (PLL). The information bits may be scrambled using a long scrambling sequence in order to further decrease the vulnerability of the system to interception.

Conventional cordless telephones utilizing direct sequence spread spectrum coding also use binary phase shift keying (BPSK). In a phase shift keyed system, information is carried in the phase of the signal. For example, in FIG. 1A, the binary sequence 1 0 1 1 0 is represented as a series of positive and negative voltage levels. In FIG. 1B, the same sequence has been phase shift keyed modulated. In FIG. 1B, two different phases are used to denote the two different digital values. Note that whenever the sequence transitions from a "1" to a "0" or from a "0" to a "1", the phase of the signal in FIG. 1B transitions. Such a system is referred to as a BPSK system.

FIG. 2 is a block diagram showing a prior art BPSK architecture. This architecture may be used by both the base unit and handset. The baseband spread spectrum signal is produced by a digital portion of the architecture which is not shown in FIG. 2. The digital spread spectrum waveform is converted to a baseband analog signal by a one bit digital-to-analog converter (DAC) 62. The baseband signal is then amplified by a baseband amplifier 60. After amplification, the signal is passed through bandpass filter 58. The bandpass filter 58 is necessary because the baseband spread spectrum signal contains higher order harmonics which are removed before transmission in order to avoid transmitting out of band energy. In addition, the bandpass filter 58 attenuates signal energy at frequencies at or near 0 Hz. Attenuation of the low frequency components of the baseband signal aids in suppression of the radio frequency (RF) carrier frequency component of the radio output.

The filtered output of the bandpass filter 58 is modulated with an RF carrier by a mixer 56. The RF carrier is generated by a phase lock loop comprised of a voltage control oscillator (VCO) 44, a lowpass filter 46 and a frequency mixer/phase detector 48. During operation, the mixer/phase detector 48 is programmed by the digital architecture to control the VCO 44 to generate an RF sinusoidal signal at the selected wireless link center frequency. The signal produced by the VCO 44 is applied to the mixer 56 such that the output of the mixer 56 is a BPSK waveform at the desired RE transmit frequency.

The RF BPSK waveform is amplified by an amplifier 54. In addition, the BPSK waveform is amplified by a variable gain power amplifier 50. The gain of the power amplifier 50 is set based upon a transmit power level indication received from the digital architecture and converted to usable form by a power amplifier level control unit 52. The gain of the power amplifier 50 at the transmitter may be decreased as the path loss between the handset and base unit is decreased in order to conserve power. During a transmission period of the time division duplex operation, an RF switch 22 connects the output of the power amplifier 50 to a radio frequency lowpass filter 20. The output of the lowpass filter 20 is transmitted to the receiving unit over an antenna.

During a reception period of the time division duplex operation, a receive signal passes through the lowpass filter 20. The radio frequency switch 22 connects the output of the lowpass filter 20 to an RF bandpass filter 24. The output of the bandpass filter 24 is passed to a variable gain low noise amplifier 26. The gain of the low noise amplifier 26 is selected by an LNA gain level indication generated by the digital architecture. The gain of the low noise amplifier is decreased as the path loss between the base unit and the handset decreases in order to avoid saturation of the receive circuitry. In order to discern the phase of the received signal at the baseband, the received RF signal is down converted using an in-phase and quadrature component of the RF signal produced by the phase lock loop. The RF signal produced by the phase lock loop is shifted by 90 degrees by a phase shifter 42 before use in the quadrature receive path. The in-phase and quadrature components are applied to the mixers 28A and 28B respectively. The output of the mixers 28A and 28B are passed to bandpass filters 30A and 30B, respectively. The output of bandpass filters 30A and 30B are passed to variable gain amplifiers 32A and 32B respectively. The gain of the variable gain amplifiers 32A and 32B is set by a baseband gain level indication received from the digital architecture to control the signal level supplied to subsequent components. The output of the variable gain amplifiers 32A and 32B is converted to a digital representation by analog-to-digital converters (ADCs) 34A and 34B.

The output of ADCs 34A and 34B is sent to matched filters 38A and 38B via a phase rotator 36. The phase rotator 36 attempts to compensate for any frequency offsets affecting the received baseband signal. Although both the transmitting and receiving units have a PLL, the carrier signal produced by the receiving unit is never exactly the same as the carrier signal produced by the transmitting unit due to injected noise, reference frequency variations and other sources of errors. Any difference between the transmitter and receiver carrier signals modulates the resulting baseband signal produced by the receiving unit. The phase rotator 36 attempts to detect and correct for errors due to frequency and phase offsets which modulate the baseband signal.

The matched filters 38A and 38B perform the despreading functions. The despreading function removes the direct sequence spread spectrum modulation from the received signal. The outputs of the matched filters 36A and 36B is input into a BPSK demodulator 40. The BPSK demodulator 40 uses the amplitude of the output of each matched filter 38A and 38B in order to recover the transmitted information bits from the received signal. A differential decoding stage may also be used if the information bits have been differentially encoded at the transmitter.

When BPSK modulation is used in a spread spectrum system, a mixer is used to modulate the baseband spread spectrum signal onto an RF carrier suitable for transmission over the wireless link. The process of mixing onto an RF carrier can increase the size, cost and power consumption of the cordless telephone system.

In addition, the demodulation of a BPSK signal requires the detection of the phase of the received baseband signal. A system which requires phase detection is sensitive to VCO errors. Errors in the VCO may be introduced by many mechanisms such as injection of radiated RF noise and conduction of noise on the DC supply voltage. In addition, during a transmit period, leakage of the RF transmitted signal into the PLL may cause the frequency of the VCO output signal to diverge from the desired value through a phenomenon termed "VCO pulling." VCO pulling causes a frequency offset in the transmitted signal which modulates the recovered baseband signal at the receiving unit. Even when the transmit period ends and the receive period begins, there may be an initial time interval during which the PLL reacquires frequency lock at the desired frequency to overcome the effects of VCO pulling. During the reacquisition time interval, the received baseband signal continues to be effected by the VCO errors.

Any error in the frequency of the RF signal generated by the VCO within the receiver relative to the VCO within the transmitter causes the received BPSK signal to have an amplitude modulation at a frequency equal to the VCO cumulative errors. The presence of amplitude modulation may cause bit errors and, if the modulation becomes severe, the receiver may fail to recover the transmitted information.

Therefore, there has been a long felt need to have an alternate modulation technique and architecture which overcomes the problems and inefficiencies encountered in a direct conversion radio, DSSS BPSK wireless communication system.

SUMMARY OF THE INVENTION

A cordless telephone incorporates continuous phase, frequency shift keying (CPFSK) modulation to create an efficient RF/analog architecture. A spreading sequence with low spectral energy at or near 0 Hz is used to digitally spread information bits within a digital architecture. The resulting digital sequence is converted to an analog baseband signal. The analog baseband signal is bandpass filtered to further reduce the spectral energy at or near 0 Hz. The resulting signal is called the modulation control signal. The modulation control signal is summed with a control voltage generated by a phase lock loop. The summed result is applied to the control input of a voltage controlled oscillator. The resulting VCO output is amplified and transmitted over the wireless link. The phase lock loop incorporates a lowpass filter which greatly reduces the effect of the modulation control signal on the lock state of the phase lock loop.

Within the receiver architecture, the received RF waveform is converted into in-phase and quadrature baseband components. The in-phase and quadrature baseband signal components are converted to digital form and demodulated. The resulting sequence is despread to produce estimated bit data.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein.

DETAILED DESCRIPTION OF THE PREFERRED EMBODIMENT

Figure 1A:
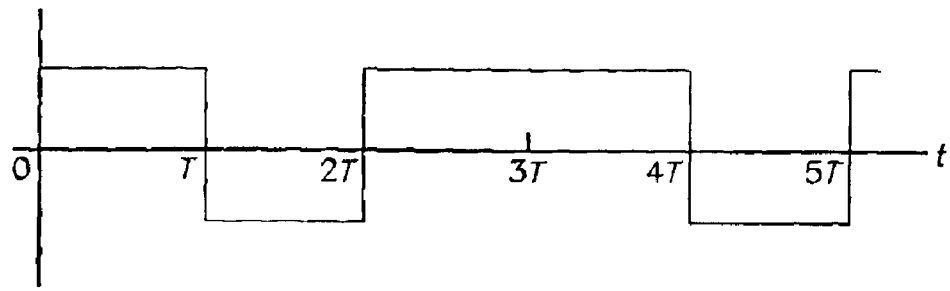
FIG. 1 is a time domain diagram illustrating binary phase shift keying (BPSK) and continuous phase frequency shift keying (CPFSK) modulation waveforms.
Figure 1B:
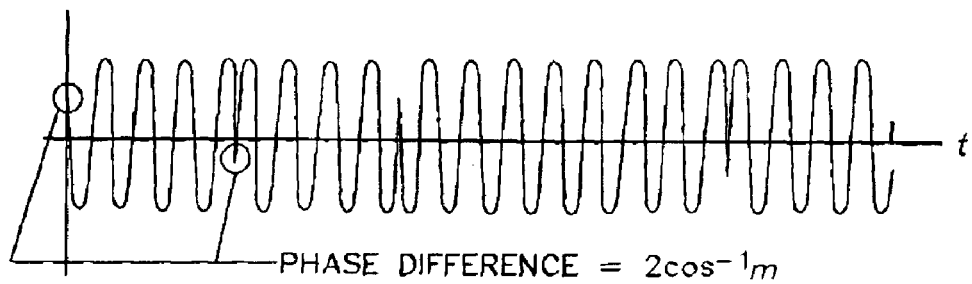
Figure 1C:
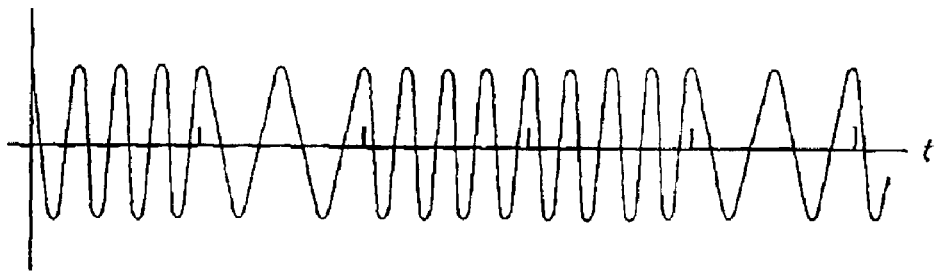

In a frequency shift keyed system, digital information is carried in the frequency of the signal. For example, in FIG. 1A, the binary sequence 1 0 1 1 0 is represented as a series of positive and negative voltage levels. In FIG. 1C, the same sequence has been frequency shift key modulated. In the particular scheme shown in FIG. 1C, a digital value of "1" has been represented by a higher frequency than the digital value "0". Also note in FIG. 1C that when a transition between a 1 and a 0 occurs, the phase of the signal does not experience an abrupt change but rather a smooth transition from the first frequency to the second frequency is made. Such a system is referred to as a continuous phase frequency shift keyed system.

Figure 3:
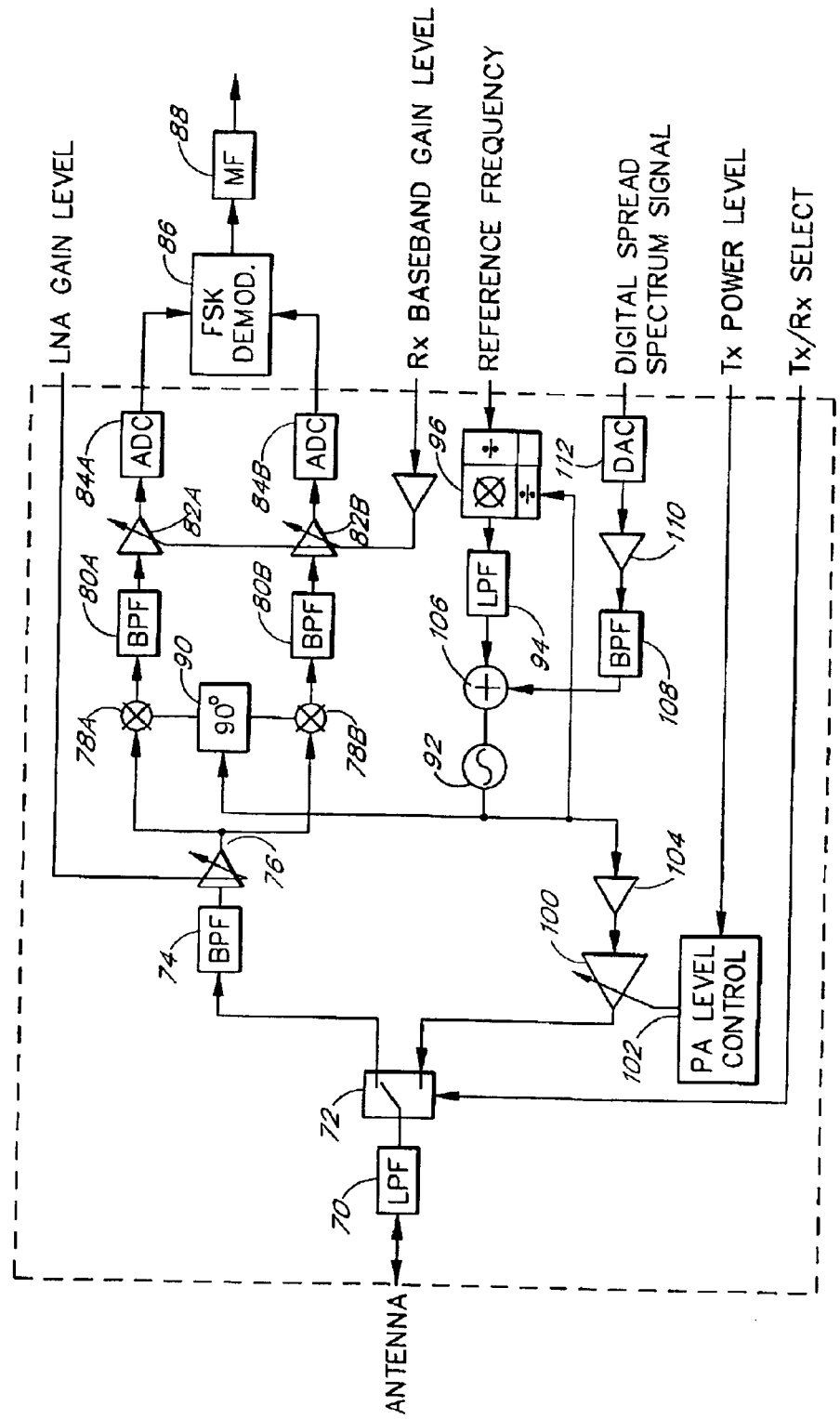
FIG. 3 is a block diagram showing the architecture of a direct conversion radio, time division duplex, direct sequence spread spectrum cordless telephone handset or base unit using continuous phase frequency shift keying.

FIG. 3 is a block diagram showing the architecture of a direct conversion radio, time division duplex, direct sequence spread spectrum cordless telephone handset or base unit. A digital spread spectrum signal such as the one shown in FIG. 1A, is generated in a digital architecture not shown in FIG. 3. The digital spread spectrum signal is applied to a one bit digital to analog converter (DAC) 112. It is helpful to note that the output of the DAC 112 is not a baseband representation of the spectrum for transmission (as shown, for example, in FIG. 1C) but is instead an analog representation of the digital signal. In the most general embodiment, a DAC with more than one input bit may be used. The output of the DAC 112 is applied to an analog amplifier 110. The output of the amplifier 110 is applied to a bandpass filter 108 to produce the modulation control signal. The analog representation of the digital spread spectrum signal may be filtered by the bandpass filter 108 (or with a highpass filter) with minimal loss of information in the transmitted signal because the data has been modulated with a spreading code chosen to minimize the information content at frequencies at or near 0 Hz. The effect of the combination of the chosen spreading code and the bandpass filter 108 is that the low frequency energy of the modulation control signal is minimal.

The modulation control signal is injected into the control loop of a phase lock loop comprised of a voltage control oscillator (VCO) 92, a lowpass loop filter 94 and a frequency mixer/phase detector 96. During operation, the mixer/phase detector 96 is programmed by the digital architecture to control the VCO 92 to generate an RF signal at the selected wireless link center frequency. In the absence of the modulation control signal, the RE output of the VCO 92 is locked to the phase of a reference signal which is also input into mixer/phase detector 96.

The modulation control signal is summed with the control voltage of the VCO 92 by an adder 106. The adder 106 may be one of a variety well-known devices including a simple resistive network. Because the modulation control signal has a minimal low frequency component, the effects of injecting the modulation control signal into the loop is minimal. The high frequency components of the modulation signal index are filtered out by the lowpass filter 94 so that the PLL does not react to the high frequency components.

The RF signal at the output of VCO 92 ($v_o(t)$) is mathematically related to the modulation control signal ($v_i(t)$) by the following equation, where $f_o$ is the frequency at which the PLL is programmed to operate:

$$v_o(t) = \cos\left(2\pi f_0 t + \int_0^t v_i(\tau) d\tau\right)$$

The modulation control signal, $v_o(t)$, is a CPFSK modulation signal at the output of bandpass filter 108. Comparing FIG. 3 to FIG. 2 reveals that the VCO 92 is directly modulated with the modulation control signal, thereby eliminating the use of a discrete mixer (such as the mixer 56 in FIG. 2) for upconversion of an analog baseband signal to an RF frequency output signal. Elimination of a separate upconversion process decreases the size, cost and power consumption of the system.

The output of the VCO 92 is amplified by an amplifier 104. In addition, the RF transmit signal is amplified in a variable gain power amplifier 100. The gain of the variable gain power amplifier 100 is set according to a transmit power level indication received from the digital architecture and converted to usable form by the power amplifier level control unit 102. The output of the variable gain power amplifier 100 is passed to an RF switch 72. During the transmission period of the time division duplex operation, the RF switch 72 connects the output of the variable gain power amplifier 100 to a lowpass filter 70, according to a transmit/receive select indication received from the digital architecture. The output of lowpass filter 70 is transmitted with an antenna.

During the receive periods of the time division duplex operation, RF signals are received from an antenna and passed through the lowpass filter 70. The RF switch 72 connects the output of lowpass filter 70 to the input of a bandpass filter 74. The output of the bandpass filter 74 is connected to a variable gain low noise amplifier 76. The gain of the variable gain low noise amplifier 76 is set by an LNA gain level indication received from the digital architecture. The gain of the variable gain low noise amplifier 76 may be decreased as the path loss between the handset and base unit decreases in order to avoid overdriving subsequent stages.

In order to discern the frequency of the received RF signal, the output of the low noise amplifier 76 is down converted into in-phase and quadrature-phase components. The output of the VCO 92 is input into a phase shifter 90 such that an in-phase and quadrature component of the output of the VCO 92 is applied respectively to mixers 78A and 78B. During a receive period, the spread spectrum input to the adder 106 is not present, therefore, the output of the VCO 92 is simply an unmodulated RF sinusoidal signal. The output of the mixers 78A and 78B are applied to bandpass filters 80A and 80B respectively. The outputs of the bandpass filters 80A and 80B are applied to variable gain amplifiers 82A and 82B respectively. The gain of the variable gain amplifiers 82A and 82B is set by a receive baseband gain level indication received from the digital architecture. The receive baseband digital gain indication sets the output level of the gain of the amplifiers 82A and 82B to a proper level for input into subsequent processing stages. The output of the amplifier 82A and 82B is converted to a digital representation by analog-to-digital converters (ADCs) 84A and 84B respectively. The output of the ADCs 84A and 84B are sent to an FSK demodulator 86. The FSK demodulator 86 estimates the phase transition between successive chips by calculating the phase angle between them. In a binary CPFSK modulation scheme, only 2 allowed phase transitions occur: a transition from the higher frequency to the lower frequency and a transition from the lower frequency to the higher frequency. Estimating the sequence of phase transitions between adjacent chips effectively provides an estimate of the digital value of each chip in the received chip sequence. The estimated chip data is sent to a matched filter 88 which removes the effect of the spreading code and, thereby, provides an estimate of the transmitted information bits.

Figure 2:
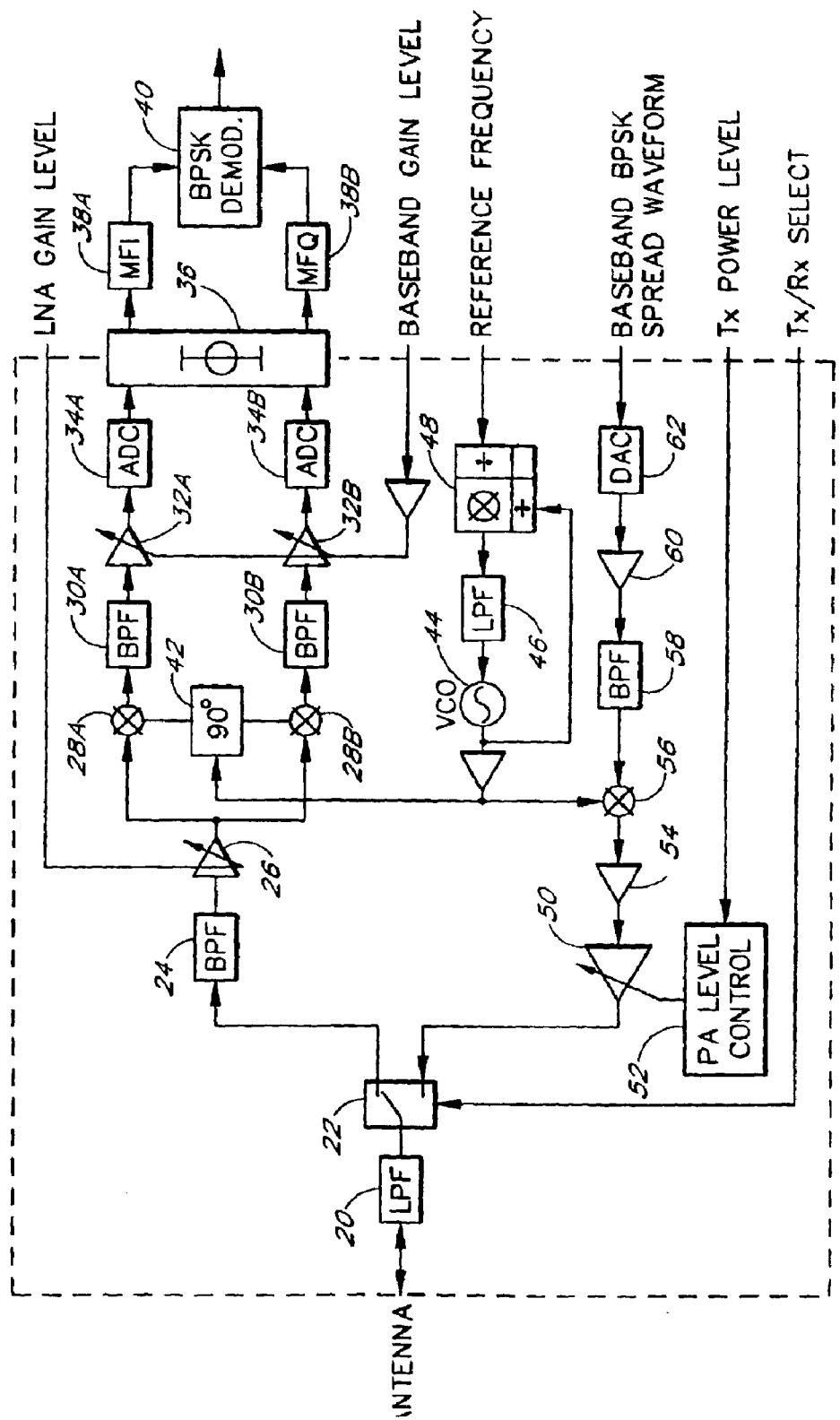
FIG. 2 is a block diagram showing a prior art binary phase shift keyed architecture of a handset or base unit.

One advantage of the CPFSK architecture of FIG. 3 over the BPSK architecture of FIG. 2 is that the architecture of FIG. 3 is less sensitive to VCO errors. In a BPSK system, the phase of the received signal is directly estimated. Any offset in the receiver VCO frequency relative to the transmitter VCO frequency modulates the baseband received BPSK signal at the offset frequency. Unless compensation for the undesired modulation (such as the phase rotator 36 in FIG. 2) is included in the demodulation process, the undesired modulation results in errors in recovering the transmitted data. On the other hand, in a CPFSK system the demodulator uses the phase transition as the signal changes continuously from one frequency state to another. The measurement of phase transition from one frequency to another is not effected by offsets in the receiver VCO frequency relative to the transmitter VCO frequency because the differential phase transition remains the same even if the VCO frequencies are offset.

VCO errors and offsets may be generated by a variety of phenomenon. For example, any low frequency noise on the DC power supply voltage line for the VCO may modulate the phase of the output of the VCO. In addition, the VCO output frequency may be dependent upon the impedance level which the VCO is driving. Therefore, if the impedance level seen by the VCO 92 changes when a transition between transmission and reception in the time division duplex operation occurs, the output frequency of the VCO may experience phase errors during the transition. Because the architecture of FIG. 3 uses a direct modulation and conversion scheme to create the digital transmit signal, the signal at the output of the variable gain power amplifier 100 is a delayed version of the output of the VCO 92. For this reason, any RF leakage which occurs from the variable gain power amplifier 100 back to the phase lock loop is much less likely to effect convergence to the desired frequency than in the configuration shown in FIG. 2 where the output of the VCO 44 is unmodulated as compared to the modulated output of the variable gain power amplifier 50. In this way, VCO errors are reduced and the sensitivity of the radio to VCO errors is reduced thereby eliminating the need for a compensation component (such as the phase rotator 36 of FIG. 2.) For these reasons, the performance of the FSK system in increased and the size, cost and power consumption of the base unit and handset in the FSK system are decreased.

Another advantage of the CPFSK architecture in FIG. 3 over the BPSK architecture in FIG. 2 is that only one matched filter 88 is required as opposed to two matched filters 38A and 38B in the BPSK architecture. A typical matched filter is implemented using digital circuitry in an ASIC. Elimination of a matched filter reduces the size, cost and power consumption of the base unit and handset. The use of a single matched filter is possible in the FSK architecture because demodulation is performed at the chip level rather than the bit level. In this way, the in-phase and quadrature components have been combined into a single bit stream before the despreading process. By comparison, the BPSK architecture does not lend itself to the use of a single matched filter because the matched filtering is performed on both an in-phase and a quadrature-phase component of the complex signal.

Although a variety of modulation characteristics can be applied to the general architecture shown in FIG. 3, in one embodiment, the RF carrier frequency output by the VCO for both transmission and receive is within the range of 902–928 megahertz (MHz). The CPFSK modulated frequencies may be offset from the RF carrier frequency such as by +/−480 kilohertz (kHz). The direct sequence spread spectrum characteristics may also take on a variety of values. In one example, the information bit rate is 100 kilobits per second and the chip rate is 1.2 megachips per second. Each bit may be modulated a 12 chip spreading sequence.

The invention was illustrated herein with respect to a cordless telephone environment. However, the invention is broadly applicable to a number of environments which incorporate a wireless link.

The invention may be embodied in other specific forms without departing from its spirit or essential characteristics. The described embodiments is to be considered in all respects only as illustrative and not restrictive and the scope of the invention is, therefore, indicated by the appended claims rather than by the foregoing description. All changes which come within the meaning of equivalency of the claims are to be embraced within their scope.

What is claimed is:

1. A communication device comprising:
   a digital to analog converter (DAC) having an input for receiving a digital spread spectrum signal and having an analog output;
   a filter having an input coupled to the DAC analog output and having an output; and
   a phase locked loop having a voltage controlled oscillator (VCO) generating a radio frequency (RF) output;
   wherein a modulation control signal at the filter output is summed with a control voltage of the VCO such that the VCO is modulated by the modulation control signal to produce a continuous phase frequency shift key modulated RF output signal at a transmit frequency of the communication device.

2. The communication device of claim 1, further comprising a receiver, and wherein a same frequency band is used for both transmission and reception.

3. The communication device of claim 2, wherein a receive input signal is time division duplexed (TDD) with a transmit output signal.

4. The communication device of claim 3, further comprising:
   an output filter; and
   a switch to couple the output filter to the VCO output during a transmit period and to couple the output filter to the receiver during a receive period.

5. The communication device of claim 3, wherein the RF output of the VCO is coupled to the receiver, and wherein the filtered output is summed with the control voltage only during a transmit period.

6. The communication device of claim 2, wherein the frequency band is about 902–928 MHz.

7. The communication device of claim 1, wherein the digital spread spectrum signal comprises information bits, wherein each information bit is modulated with a twelve chip spreading sequence.

8. The communication device of claim 7, wherein an information bit rate is about 100 kilobits per second.

9. A communication device comprising:
- a digital to analog converter (DAC) having an input for receiving a digital spread spectrum signal and having an analog output;
- a voltage controlled oscillator (VCO) having a control input and a radio frequency (RF) output;
- a phase detector coupled to the RF output of the VCO and generating a control output;
- a loop filter having an input coupled to the phase detector control output and an output;
- an adder having a first input coupled to the loop filter output, a second input coupled to the DAC analog output, and an output coupled to the VCO control input;
- wherein the VCO output is continuous phase frequency shift key modulated in response to the summed output.

10. The communication device of claim 9, wherein the digital spread spectrum signal comprises a data signal that is modulated using a spreading sequence having an equal number of ones and zeros.

11. The communication device of claim 9, wherein the digital spread spectrum signal has minimal information content near 0 Hz.

12. The communication device of claim 9, further comprising an analog filter disposed between the DAC output and the second input to the adder, wherein the analog filter attenuates energy at, and near, 0 Hz.

13. The communication device of claim 12, wherein the analog filter is a highpass filter.

14. The communication device of claim 12, wherein the analog filter is a bandpass filter.

15. The communication device of claim 9, wherein a frequency of the VCO RF output is an output frequency of the communication device.

16. A method of generating a wireless communication signal comprising:
- generating a radio frequency (RF) signal at a transmit frequency using a phase lock loop (PLL);
- converting a digital spread spectrum waveform to an analog representation;
- generating a modulation control signal by filtering the analog representation; and
- summing the modulation control signal with a phase lock loop control signal to continuous phase frequency shift key modulate the RF signal.

17. The method of claim 16, wherein the act of filtering the analog representation comprises highpass filtering the analog representation to attenuate frequencies at, or near, 0 Hz.

18. The method of claim 16, wherein the act of filtering the analog representation comprises bandpass filtering the analog representation to attenuate frequencies at, or near, 0 Hz.

19. The method of claim 16, wherein the digital spread spectrum waveform has minimal information content frequencies at, or near, 0 Hz.

20. A system for receiving a spread spectrum signal, the system comprising:
- a first analog to digital converter receiving an in-phase baseband component of a received signal and producing in-phase digital data;
- a second analog to digital converter receiving a quadrature baseband component of the received signal and producing quadrature digital data;
- a frequency shift keying demodulator receiving the in-phase and quadrature digital data and estimating a phase transition between successive chips to produce demodulated chip data; and
- a matched filter receiving the demodulated chip data and producing estimated bit data.

21. The system of claim 20, wherein a single matched filter is used for receiving the demodulated chip data and producing the estimated bit data.

22. The system of claim 20, wherein the frequency shift keying demodulator estimates the phase transition between successive chip by calculating a phase angle between successive chips.

23. A method of demodulating a radio frequency spread spectrum signal, wherein data bits are each modulated with a spreading sequence having a series of chips, the method comprising:
- generating an in-phase baseband component and a quadrature baseband component of the radio frequency spread spectrum signal;
- converting the in-phase baseband component and quadrature baseband component to an in-phase digital data stream and a quadrature digital data stream, respectively;
- estimating a phase transition between successive chips to generate a demodulated chip stream; and
- despreading the demodulated chip stream to produce estimated information bit data.

24. The method of claim 23, wherein a single matched filter is used in despreading the demodulated chip stream.

25. A system for demodulating a radio frequency spread spectrum signal, wherein data bits are each modulated with a spreading sequence having a series of chips, the system comprising:
- means for generating an in-phase baseband component and a quadrature baseband component of the radio frequency spread spectrum signal;
- means for converting the in-phase baseband component and quadrature baseband component to an in-phase digital data stream and a quadrature digital data stream, respectively;
- means for estimating a phase transition between successive chips to generate a demodulated chip stream; and
- means for despreading the demodulated chip stream to produce estimated information bit data.

26. The system of claim 25, wherein a single matched filter is used in the despreading means.

* * * * *